Patented Mar. 25, 1947

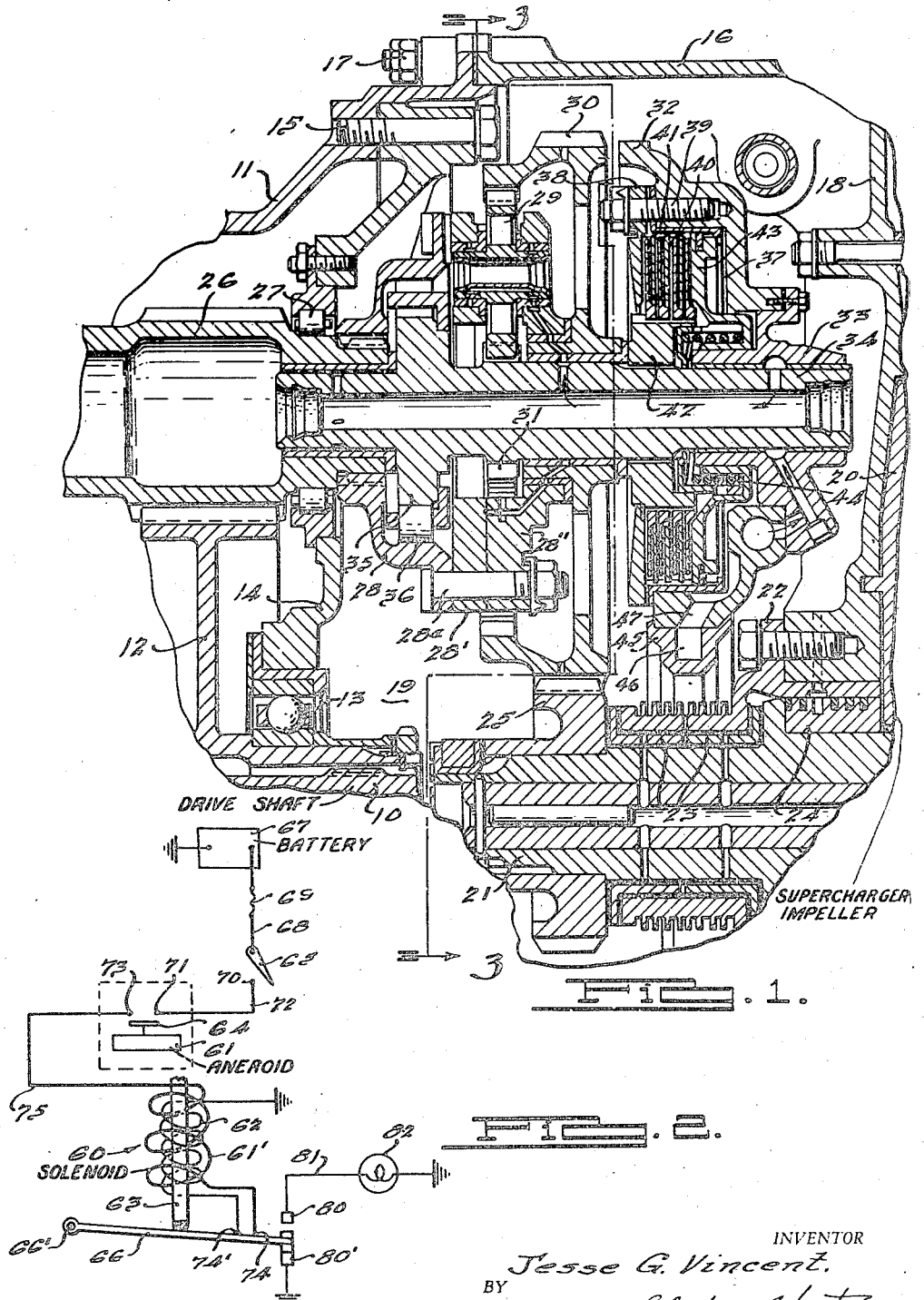

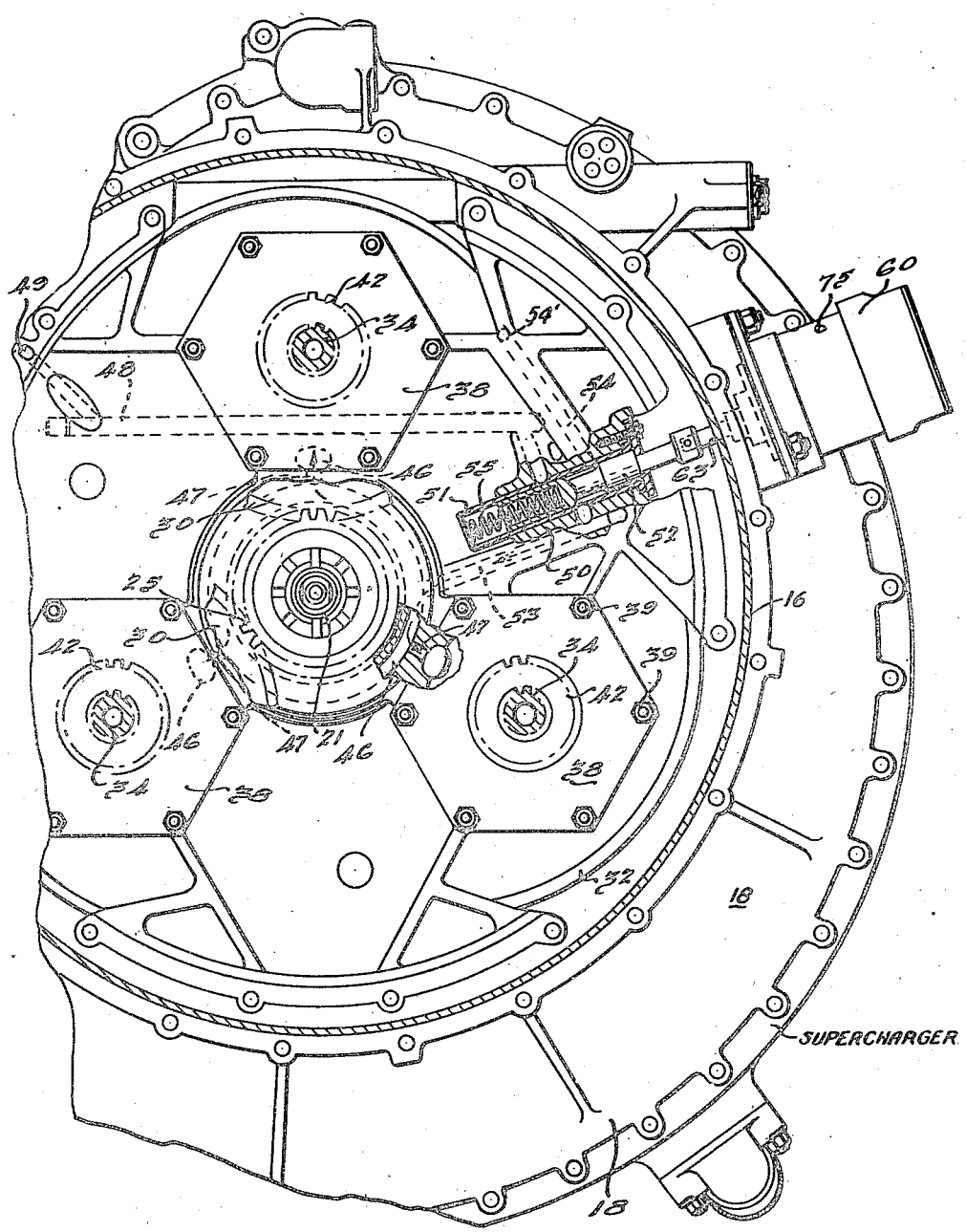

2,418,102

UNITED STATES PATENT OFFICE 2,418,102

INTERNAL-COMBUSTION ENGINE

Jesse G. Vincent, Grosse Pointe Park, Mich., assignor to Packard Motor Car Company, Detroit, Mich., a corporation of Michigan Application April 19, 1943, Serial No. 483,669

5 Claims. (Cl. 123—119)

This invention relates to drive mechanism and more particularly to mechanism for driving aircraft engine supercharger devices.

Supercharger devices for aircraft engines are usually provided with mechanism that can be controlled to drive impeller means at different high speeds, the higher speed being employed for the higher elevation. It is customary to equip the drive mechanism with control means that can be manually actuated to select the driving speed.

An object of this invention is to provide a multi-speed supercharger drive mechanism for aircraft engines with control means that will function automatically to establish the highest driving speed above a predetermined elevation.

Another object of the invention is to provide an aircraft supercharger drive mechaninsm in which a planetary gearing sun gear is controlled by a fluid system having a control valve operated by an electric system controlled by an aneroid.

Still another object of the invention is to control a fluid valve in a two-speed drive control by means of a solenoid operating in response to an aneroid so that the drive selection will be made automatically and smoothly.

Another object of the invention is to provide an electric control system for an aircraft engine supercharger multiple drive device with a signal that will be effective to indicate when the highest driving speed is established.

Other objects of the invention will appear from the following description taken in connection with the drawings, which form a part of this specification, in which:

Fig. 1 is a fragmentary longitudinal vertical section through a supercharger device showing the drive selector control means;

Fig. 2 is a diagrammatic view of the electrical control system for the valve in the fluid brake system;

Fig. 3 is a transverse sectional view taken approximately on line 3—3 of Fig. 1.

The supercharger device illustrated forms a part of a conventional internal combustion engine for use with air craft. The shaft 10 can be the engine crankshaft or an extension thereof contained in engine casing 11. A drive gear 12 is splined on the shaft end and is mounted in a bearing 13 in wall 14 at an end of the engine casing, such wall being secured to the casing by bolts 15.

An accessory such as a supercharger device is carried in casing 16 secured to the engine casing by bolts 17 and a transversely extending wall 18 in casing 16 forms a partition separating the drive mechanism chamber 19 from the fuel chamber containing impeller means 20. The impeller means is fixed on shaft 21 and such shaft extends through wall 18 and is mounted in a journal bearing consisting of bushing 22, floating sleeves 23 and bearing member 24 fixed on the shaft. Gear 25 is fixed to the end of shaft 21 in chamber 19.

Drive mechanism is provided between gears 12 and 25 and steps up the driving speed transmitted from the crankshaft to the impeller shaft. The drive mechanism also includes planetary gearing sets that can be controlled to provide two driving speeds. There are three gearing sets and as they are alike, only one set is shown in detail. A hollow gear 26 mounted in bearing 27 extends through wall 14 and planet gear cage in chamber 19 is fixed thereto, such cage being composed of sections 28, 28' and 28" secured together by bolts 28a. Planet gears 29 are carried by the cage sections 28' and 28" and mesh with ring gear 30 and sun gear 31, the ring gear being formed to mesh with gear 25. A wall 32 in chamber 19 has a bearing member 33 supporting one end of shaft 34 on which the sun gear is formed or fixed and the other end of this shaft is carried in the hollow gear 26. Such shaft has a hub 35 with peripheral cam surfaces and rollers 36 lie between the cam surfaces and the cage section 28 to provide a one-way overrunning clutch by means of which a direct drive is established through the planetary gearing when the sun gear and its shaft are free. This arrangement provides the lower speed drive for the impeller means.

The sun gear is controlled by brake mechanism that can be made effective to hold shaft 34 stationary under predetermined conditions. Wall 32 has a chamber 37 therein with a backing plate 38 secured across the open end by studs 39. Plates 40 engage alternately in grooves formed by cylinder 41 fixed in chamber 37 and in grooves in hub 42 splined on shaft 34 and are pressed together or released by an actuator member 43 in the form of a piston. Such piston is urged into plate releasing position by coil spring 44, under which condition the sun gear shaft is free and the overrunning clutch will be effective to establish drive through the planetary gearing, and is pressed into plate engaging relation by fluid means to hold the sun gear stationary.

A manifold 45 in the form of a ring member is fitted tightly in wall 32 and is formed with a peripheral groove 46 connected with a fluid pressure system, such as the engine lubricating system. The chambers 37 are connected with the manifold groove by ports 47. Passage 48 in wall 32 has an inlet end 49 connected with a conventional engine lubricating oil pressure system and an outlet end opening to a hollow boss 50 in which sleeve 51 forming a chamber for piston valve 52 is arranged. Passage 53 leads from the boss to the manifold groove 46 and a relief passage 54 leads from the boss and opens 54' into chamber 19. The sleeve 51 has openings therethrough registering with passages 48, 53, and 54, and the valve has a reduced diameter portion which serves to allow oil flow through the sleeve chamber between passages 48 and 53 when the valve is pressed inwardly. Coil spring 55 in the valve sleeve biases inward movement of the valve and normally moves the valve to outward position blocking oil flow between passages 48 and 53. The valve, when in outward position, provides an open connection between passages 53 and 54 for the purpose of relief or drainage.

The valve is moved to establish oil flow to the brake chambers 37 by a solenoid 60 in an electric system under control of atmospheric pressure responsive means, such as aneroid 61. The solenoid has a pushing coil 61' and a holding coil 62 acting upon the valve stem 63. The coils are in an electric circuit that can be controlled by switch 64, closed by the aneroid above a predetermined altitude, by a manually operable switch 65 and by a resilient switch 66 actuated in one direction by the valve rod. Switch 65 is connected with battery 67 by conductor 68 having fuse 69 therein, and contact 70 of switch 65 is connected with contact 71 of switch 64 by conductor 72. Contact 73 of switch 64 has conductor 75 attached thereto and such conductor terminates in the shifting solenoid coil 61' that is connected with terminal 74 on switch 66. Holding coil 62 is connected to terminal 74' on switch 66 at one end and is grounded at the other end. Switch 66 forms a conductor through which current can flow when switches 64 and 65 are closed and has an insulated anchor 66'. When the electric system is deenergized by opening either switch 64 or 65, the solenoid will be ineffective and spring 55 will move the valve stem outwardly forcing the switch 66 into engagement with grounded contact 80'. When the switches 64 and 65 are closed, the electric circuit is completed through coil 61' and the solenoid coil 61' will act to move the valve inwardly to open the fluid circuit to force actuator member 43 in a direction applying the brakes to establish the higher speed drive. As the valve stem moves inwardly, it will be followed by resilient switch 66 which will flex away from contact 80' and the circuit through the holding coil 62 will now be established in series with coil 61 and will act to hold the valve in open position until either switch 64 or 65 is opened.

Advantage is taken of such self-opening movement of switch 66 to energize a signal lamp 82 signifying that the drive mechanism is operating in the higher speed range. Contact 80 is arranged in the path of the flexing movement of switch 66 and is engaged thereby, when released by the valve stem, to energize conductor 81 of the light circuit. When either switch 64 or 65 is opened, the coil and light circuits will be deenergized and spring 55 will move the valve to closed position so that the lower speed impeller drive through the overrunning clutch is established. At the same time, the valve stem will move the switch 66 away from contact 80 and into engagement with contact 80'.

The manually operable switch 65 and the aneroid operated switch 64 are in series and obviously switch 65 must be closed in order to allow the solenoid to be energized to permit the fluid system to engage the sun gear holding brakes. When the switch 65 is closed and the switch 64 is open, the sun gear brakes will be released so that the overrunning clutch will establish low speed drive through the planetary gearing. Such low speed drive will be effective below a predetermined elevation, but above such elevation the aneroid will close switch 64 energizing the solenoid coils and moving the valve to open position so that the fluid system can engage the brakes to hold the sun gears to thereby establish the higher speed drive. As the valve rod moves inwardly to valve closing position, the switch 66 will automatically leave contact 80', breaking the grounded circuit of the shifting coil and will engage contact 80 thereby establishing the signal lamp circuit. When the aircraft drops below the predetermined elevation, the aneroid will open switch 64 so that the solenoid is deenergized and spring 55 will shift the valve to open the signal circuit and to shut off fluid flow to the brakes to thereby release the sun gear so that the lower speed drive becomes automatically effective through the overrunning clutch.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In an engine for aircraft, a supercharger impeller means, mechanism for driving the impeller means from the engine at an increased rate of speed, means operable to increase the driving speed of said mechanism, a fluid pressure system for actuating said speed increasing means, a valve in said fluid system, a solenoid for shifting said valve into open position, a spring for shifting said valve to closed position, an electric system for controlling said solenoid, and an aneroid controlling said electric system.

2. In an engine for aircraft, a supercharger impeller drive mechanism having an overrunning clutch establishing a lower speed drive and means operable to establish a higher speed drive, fluid pressure means controlling the means for establishing the higher speed drive, valve means controlling the fluid pressure means, a solenoid for shifting said valve into open position, a spring for shifting said valve into closed position, an electric system connected with said solenoid having a control switch, and an aneroid controlling operation of said switch, said aneroid expanding above a predetermined elevation to close said switch.

3. In an aircraft engine, an accessory, a two-speed drive mechanism for the accessory driven by the engine, fluid pressure controlled means for selecting the drive through the mechanism, electric means controlling the fluid pressure controlled means, and an aneroid controlling said electric means.

4. In an aircraft engine, a supercharger impeller, a two speed drive mechanism for the impeller, means for selecting the driving speed of said mechanism, pressure means controlling said selecting means, a control for the pressure means, electrically operable means for actuating the pressure means control, and an aneroid controlling said electrically operable means.

5. In a drive mechanism for an engine supercharger impeller, gearing connecting the engine in one driving relation with the impeller, fluid operated brake means for controlling the gearing to speed up the drive to the impeller when effective, a valve control for the fluid operated brake means, a solenoid for shifting said valve including an actuator coil and a grounded holding coil, an electric circuit connected with said actuator coil including a self-opening control switch and a grounded switch contact, said valve engaging the switch with the grounded contact when the solenoid is deenergized, and an aneroid controlled switch in said circuit, said coils being connected in series through connections with said control switch, said holding coil being energized when said control switch disengages the grounded contact.

JESSE G. VINCENT.

REFERENCES CITED

The following references are of record in the file of this patent:

UNITED STATES PATENTS

| Number | Name | Date |
|---|---|---|
| 2,242,519 | Frank | May 20, 1941 |
| 2,263,453 | Browne | Nov. 18, 1941 |
| 2,283,284 | Owner | May 19, 1942 |
| 899,836 | Nelson | Sept. 29, 1908 |
| 2,148,471 | Jones | Feb. 28, 1939 |
| 2,214,100 | Claytor | Sept. 10, 1940 |
| 2,248,878 | Kollsman | July 8, 1941 |
| 2,101,239 | Chilton | Dec. 7, 1937 |
| 2,205,047 | Nardone | Jan. 18, 1940 |
| 2,217,364 | Halford et al. | Oct. 8, 1940 |
| 2,173,648 | Dunn et al. | Sept. 19, 1939 |
| 2,281,916 | Claytor | May 5, 1942 |
| 2,283,434 | Halford et al. | May 19, 1942 |
| 2,316,411 | Finnegan | Apr. 13, 1943 |
| Re. 22,272 | Price | Feb. 16, 1943 |

FOREIGN PATENTS

| Number | Country | Date |
|---|---|---|
| 548,778 | British | Oct. 23, 1942 |